United States Patent [19]

Foote, Jr. et al.

[11] 4,083,737
[45] Apr. 11, 1978

[54] METHOD AND APPARATUS FOR ATTACHING A STRIP OF MATERIAL TRANSVERSELY OF A MOVING WEB

[75] Inventors: James Conklin Foote, Jr., York; William Mapstone Clemow, Pittsford, both of N.Y.

[73] Assignee: Eastman Kodak Company, Rochester, N.Y.

[21] Appl. No.: 678,087

[22] Filed: Apr. 19, 1976

[51] Int. Cl.² .............................................. B32B 31/20
[52] U.S. Cl. .................................. 156/73.1; 156/256; 156/527; 156/556; 156/580.1; 228/1 A; 228/110; 264/23
[58] Field of Search ................... 156/73.1, 73.2, 580.1, 156/309, 519, 256, 527, 556, 580.2; 228/110, 1; 264/23

[56] References Cited

U.S. PATENT DOCUMENTS

| | | | |
|---|---|---|---|
| 3,671,366 | 6/1972 | Miller | 156/580.1 |
| 3,684,608 | 8/1972 | Schmitz et al. | 156/519 |
| 3,787,257 | 1/1974 | Akerlund | 156/73.1 |
| 3,957,570 | 5/1976 | Helm | 156/519 |
| 3,963,557 | 6/1976 | Patterson | 156/519 |

FOREIGN PATENT DOCUMENTS

| | | |
|---|---|---|
| 1,011,722 | 12/1965 | United Kingdom. |
| 1,057,021 | 2/1967 | United Kingdom. |
| 1,099,503 | 0000 | United Kingdom. |

*Primary Examiner*—Edward G. Whitby
*Attorney, Agent, or Firm*—J. Addison Mathews

[57] ABSTRACT

Apparatus for and method of attaching a strip of a first material having a hot melt adhesive on both sides thereof to a second web of material. A web of first material is advanced toward and through a cutting station a distance substantially equal to the width of the strip to be formed therefrom and a strip is cut from the end of the web. The cut strip is held on the moving cutting member and is transferred to an anvil on a rotary transfer drum while the drum is stationary. The transfer drum is then rotated, with the strip on an anvil thereof, to a tacking station where a second web of material is supplied at a substantially constant velocity. The strip on the anvil is moved through the tacking station at a velocity substantially equal to the velocity of the second web and is brought into contact with a first surface of the second web. The tacking station includes ultrasonic transducer means arranged to contact the other surface of the second web as the strip is brought into contact with the first surface thereof, thereby compressing the strip and the second web and tacking the strip to the first surface of the second web.

9 Claims, 3 Drawing Figures

METHOD AND APPARATUS FOR ATTACHING A STRIP OF MATERIAL TRANSVERSELY OF A MOVING WEB

BACKGROUND OF THE INVENTION

Adhering a strip of a first material to one surface of a web is commonly practiced in forming tear strips for opening packages. Apparatus for performing this operation normally include means for cutting the strip from the end of a first web and transferring the strip to the surface of the second web to which it is to be adhered. Heated transfer arms have been utilized which activate a hot melt adhesive used to adhere the strip to the second web. However, it has been found that when the strip to be adhered to the web is provided with a hot melt adhesive on both sides thereof, it is not possible to use such a heated transfer arm, or even an ordinary heat sealer to tack the strip to the web because such a sealer would activate both adhesive surfaces, preventing its use later to adhere the web to a further element. In addition, the activation of the adhesive on both surfaces of the strip causes the strip to adhere to the applying member as much as to the web, thereby resulting in unreliable operation. Also, the activation of the hot melt adhesive on both sides of the strip often results in adhesive buildup on the applying member, thereby creating a cleanliness problem and undesirably high maintenance requirements.

Accordingly, the provision of a method and apparatus for applying a strip of material having an adhesive on both surfaces thereof would facilitate the fabrication of many articles wherein the adhesive-bearing strip can be attached to one surface of a first web which then carries the strip to engagement with another element of the article whereby the strip, with adhesive on both surfaces thereof, can be utilized to secure the first web to the second element of the article.

SUMMARY OF THE INVENTION

Accordingly, one aspect of the present invention provides apparatus for attaching a strip of a first material to a web of a second material with the apparatus comprising means for supplying a web of the first material to a cutting station and means for cutting a strip transversely from the end of the first web. Means is also provided for supplying a web of a second material to a tacking station at a predetermined velocity and for transferring the strip from the cutting station to the tacking station. Means for tacking the strip to the web of second material is provided at the tacking station which operates while both the strip and the web are moving at the predetermined velocity.

In accordance with another aspect of the invention, the tacking means comprises an ultrasonic transducer arranged to engage one surface of the web and compress it and the strip against the transferring means.

In accordance with still another aspect of the present invention, the strip of first material has a hot melt adhesive on both sides thereof and the apparatus comprises a cutting station, a rotary transfer drum having at least one strip-receiving anvil thereon, and a tacking station including a pair of ultrasonic transducers. The cutting station includes means for supplying a first web of the first material intermittently to the cutting station with the web having a width substantially equal to the length of the strip to be formed therefrom. The first web is advanced through the cutting station a distance substantially equal to the width of the strip to be formed therefrom. The cutting station also includes a stationary cutting member and a cooperating moving cutting member with means for holding the cut strip on the moving cutting member and transferring it to an anvil on the rotary transfer drum while the drum is stationary. The transfer drum is intermittently rotated, or indexed, with the strip on an anvil thereof until the strip is brought to the tacking station. The second web of material is supplied to the tacking station at a substantially constant velocity, and the rotary transfer drum is arranged to move the strip through the tacking station at a velocity substantially equal to the velocity of the second web whereby the strip is brought into contact with and transversely of a first surface of the second web. The ultrasonic transducers at the tacking station are arranged to contact the edges of the second surface of the second web as the strip is brought into contact with the first surface thereof, thereby compressing the strip and the second web between the anvil and the ultrasonic transducers and ultrasonically tacking the ends of the strip to the first surface of the second web. Thereafter, the strip is released from the anvil and is carried away by the second web.

The various features of novelty which characterize the present invention are pointed out with particularity in the claims annexed hereto and forming part of this specification. For a better understanding of the invention, its operating advantages and the specific objects obtained by its use, reference should be had to the accompanying drawings and descriptive matter in which a preferred embodiment of the present invention is illustrated and described.

BRIEF DESCRIPTION OF THE DRAWINGS

In the detailed description that follows, reference is made to the accompanying drawings in which.

DESCRIPTION OF A PREFERRED EMBODIMENT

Figure 1:
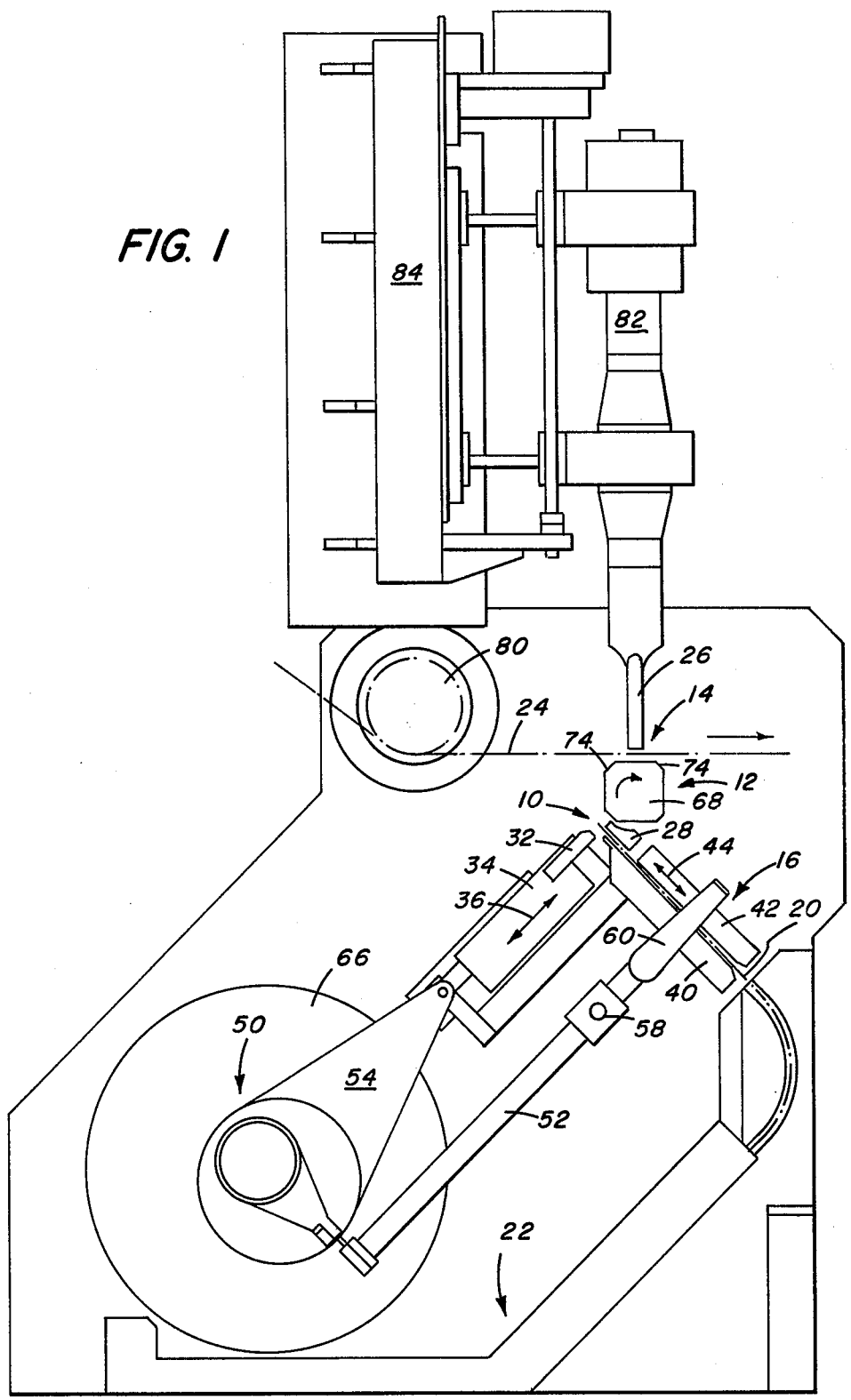
FIG. 1 illustrates the apparatus for attaching a strip of material transversely of a moving web of the present invention.
Figure 3:
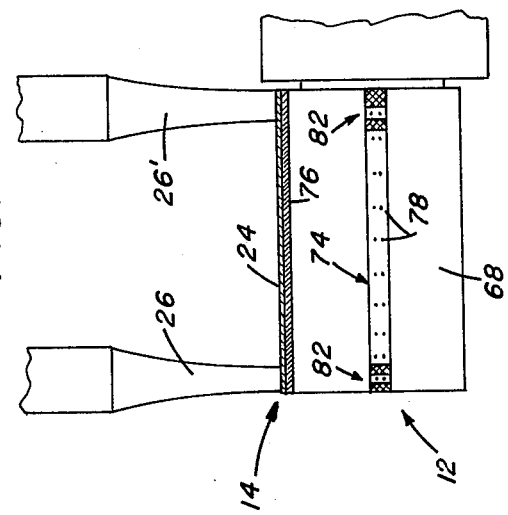
FIG. 3 is a view taken along line 3—3 of FIG. 2.
Figure 2:
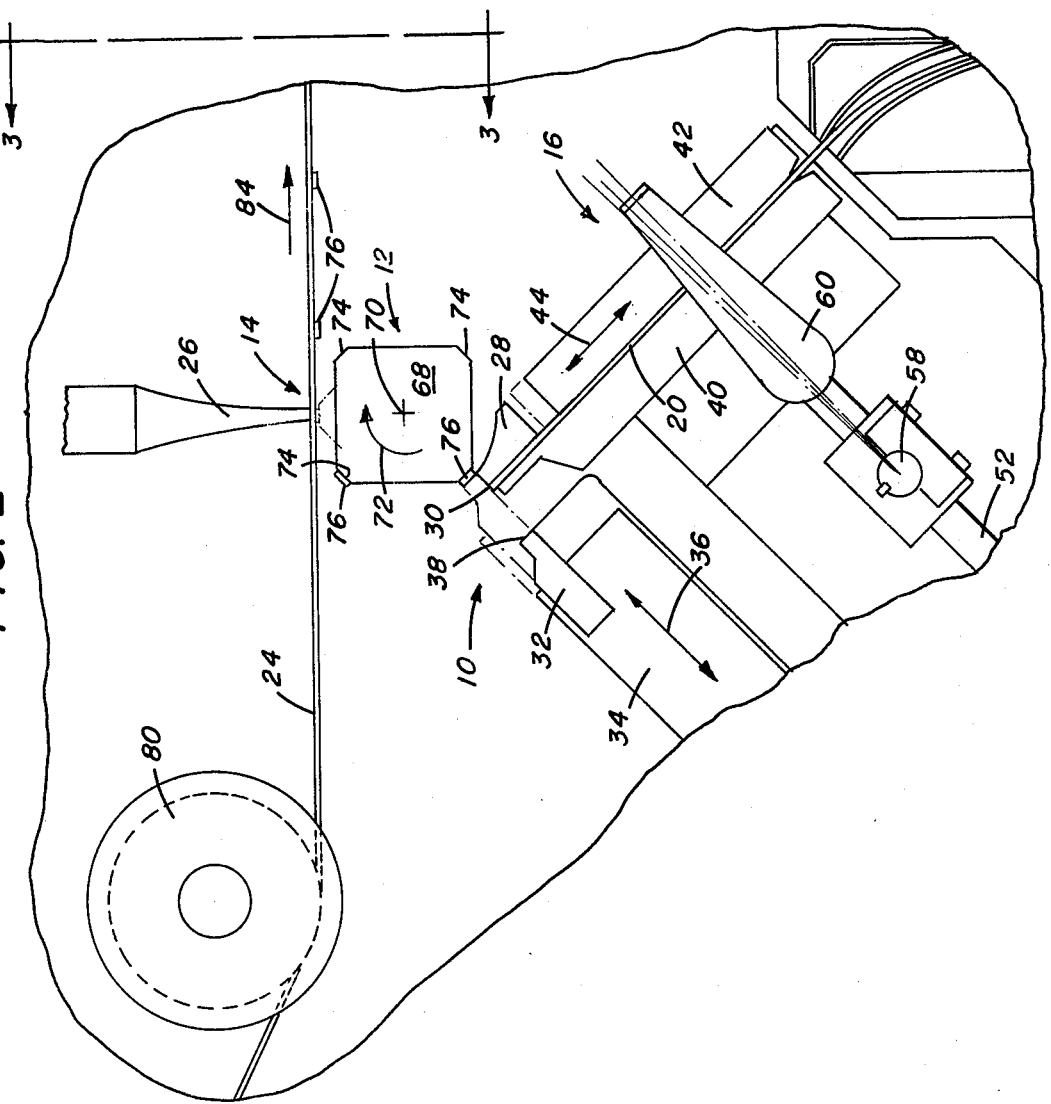
FIG. 2 is an enlarged portion of the apparatus illustrated in FIG. 1.

The apparatus of the present invention, for attaching a strip of a first material having a hot melt adhesive on both surfaces thereof to a second web of material, is illustrated generally in FIG. 1, and in more detail in FIGS. 2 and 3. The apparatus generally comprises a cutting station 10, a transfer drum 12, and a tacking station 14. In the embodiment illustrated, all of the components of the apparatus are mounted on the near surface of a vertical mounting plate, not shown. An incremental web feed shuttle 16 is also provided to supply the first web to the cutting station.

Briefly, a first web 20 of a first material, having a hot melt adhesive on both surfaces thereof, is supplied from a supply roll, not shown, through suitable guiding means 22, of a type well-known in the art, to the web feed shuttle 16 which incrementally feeds the end of the web to the cutting station 10. A movable cutter member cuts a strip from the end of the web 20 and transfers it to an anvil on the transfer drum 12. The transfer drum then rotates carrying the strip to the tacking station 14 where it is brought into contact with a first surface of a second web of material 24, with the strip and the web being compressed between an anvil on the transfer drum and the horn of at least one ultrasonic transducer 26 which is disposed at the tacking station. The strip is then released from the transfer drum and the operation is repeated. The details of this apparatus and method are more completely described hereinafter.

The cutting station 10 comprises a stationary cutting member 28 having a cutting edge 30 which is arranged to mate with a corresponding cutting edge on a cooperating movable cutting member 32 mounted on a movable holder 34 both of which are arranged for reciprocal movement as indicated by arrow 36. The end 38 of the movable cutter member 32 is provided with a plurality of vacuum openings (not shown) arranged to retain the strip cut thereby, as will be more thoroughly described hereinafter.

The web 20, from which the strips are to be cut, is supplied from a supply roll, not shown, via suitable web handling apparatus, to the reciprocating web feed shuttle 16 which feeds the end of the web to the cutting station 10 incrementally a distance substantially equal to the width of the strip to be formed, with the length of the strip being determined by the width of the web 20. The web feed shuttle comprises a stationary vacuum chamber 40 having a web engaging surface provided with a plurality of vacuum openings and a cooperating reciprocating shuttle member 42 arranged to engage the opposite surface of web 20 and also provided with a plurality of vacuum openings on the web engaging surface thereof. The shuttle member 42 is arranged for reciprocating movement as generally indicated by arrow 44. A portion of the vacuum chamber 40 extends nearly to the cutting edge 30 of the stationary cutting member 28 to provide support to the web 20. The shuttle member 42 is disposed adjacent to stationary cutting member 28, substantially as shown.

Both the reciprocating shuttle member 42 and the movable cutter member 32 are driven from a double eccentric crank drive 50 via a pivot arm 52 and a connecting rod 54, respectively. The double eccentric crank is driven by a suitable drive motor, not shown, whereby the connecting rod 54 provides direct reciprocating motion to the movable cutter member 32 and the pivot arm 52 provides the reciprocating movement to the shuttle member 42. The pivot arm 52 is connected at the lower end to its portion of the eccentric crank drive 50 and rotates about pivot 58 near the upper end thereof, which upper end is provided with a yoke 60 that extends around the stationary vacuum chamber 40 and is coupled to and drives the shuttle member 42. Thus, as the lower portion of pivot arm 52 is driven about the pivot 58 by the eccentric crank 50, the moving shuttle 42 is reciprocated in the direction of arrow 44. For clarity, both the movable cutter member 32 and the shuttle member 42 are illustrated in their fully retracted position, with the fully advanced position of both members illustrated in phantom. However, it should be noted that this is not representative of the actual operating sequence of these two elements since the cooperation between the shuttle member and the movable cutter member is such that when the cutter member is midway in the retraction stroke, the shuttle member is fully retracted, and when the cutter member is midway in the advancing stroke, the shuttle member is fully advanced. A rotary vacuum valve 66 is also mounted on the drive shaft that operates the double eccentric crank drive 50 and controls the application of vacuum to the various components of the apparatus in a manner which will be more thoroughly described hereinafter. The rotary vacuum valve itself is of a type known in the art, operating to turn the vacuum on and off to various elements as it is rotated, in a manner well known in the art.

The transfer drum 12 comprises a generally square member 68 arranged for rotation about axis 70 in a direction generally indicated by arrow 72. Each of the "corners" of the square member 68 is removed to form four equispaced anvil sections 74 each of which have a width substantially equal to the width of the strip being formed. The length of the drum in the axial direction is substantially equal to the width of web 20, and therefore the length of the strip being transferred. The rotary transfer drum 12 is connected to a drive motor, not shown, and is arranged for intermittent 90° rotation, or indexing, from one stationary position to the next. The transfer drum 12 is located so that, when it is stationary one anvil section 74 is disposed in alignment with the moving cutter element 32 at the cutting station and is arranged to accept the strip element 76 which has just been cut from the end of web 20, and another anvil is disposed adjacent the path of the second web 24 through the tacking station. As shown in FIG. 3 (and in phantom in FIG. 2) when the transfer drum 12 is rotated 45° from the position illustrated in FIG. 2, one anvil 74 is brought into alignment with the ultrasonic transducer horn 26 at the tacking station. The transfer drum is so located with respect to the tacking station that the anvil in alignment with the transducer horn slightly compresses the strip and the web 24 therebetween. The anvil portions 74 are provided with a plurality of vacuum ports 78 arranged to hold the strip 76 thereon. The drive for the rotary transfer drum 12 is so arranged that, as the drum is indexed to the next position, the anvils are accelerated to a speed substantially equal to the velocity of the second web 24 through the tacking station, as will be further described hereinbelow.

The second web 24 is directed into the tacking station 14 about a guide spool or roll 80, and is removed from the tacking station by drive means downstream, not shown. The web is driven through the tacking station at a substantially constant, predetermined velocity. As previously noted, the tacking station 14 includes a pair of ultrasonic transducers 82 having horn elements 26 arranged in transverse alignment across the web 24 to contact the lateral edges thereof. The ultrasonic transducers are mounted from the aforementioned vertical mounting plate by a bracket 84 and are stationary during normal operations. Provision is made for elevating the ultrasonic transducers away from the tacking station for maintenance purposes by means of a pneumatic cylinder, not shown. In operation, the lower ends of the transducer horns 26 ride on the edge surfaces of the top of web 24 but because the web is not backed by a backing member, no marking of that surface occurs. However, as the rotary transfer drum 12 is rotated so that a strip 76 is brought into contact with the lower, first surface of web 24, the strip 76 and the web 24 are compressed between the anvil 74 and the end of ultrasonic transducer horns 26 and are thereby tacked together. The tacking effect may be enhanced by providing a knurled surface 82 at each end of the anvil 74, which opposes the transducer horns, substantially as shown in FIG. 3. As the rotary transfer drum 12 rotates beyond the tacking station, the strip 76 is released from the anvil 74 and is carried away by the web 24, being attached to the first surface thereof. It will be understood that the tack formation between the strip 76 and web 24 may be enhanced or specifically configured by specifically forming the pads 82 on the anvils, as well as by providing specific horn tip configurations, in a manner well known in the art.

In operation, the ultrasonic transducers 82 are in the position substantially as shown in FIGS. 1 and 2, riding lightly on the upper, second surface of web 24 which is being supplied to and drawn through the tacking station 14 at a substantially constant velocity. The first web 20, from which the strips 76 are cut, is supplied to the web feed shuttle 16 through the web guiding device 22 from a supply roll, not shown. As the web 20 is supplied, the movable shuttle member 42, with the vacuum off, is moved to the full retracted position at which point the vacuum is applied to the shuttle 42 and is turned off in the stationary vacuum chamber 40. As previously noted, when the shuttle member 42 is fully retracted, the movable cutter member 32 is midway retracted in its cycle. As the cutter member 32 is fully retracted and is reversing its direction of motion toward the stationary cutting member 28, the shuttle member 42 is advancing toward the stationary cutter member 28, advancing the end of web 20 beyond the cutting edge 30 of stationary cutter 28. As the shuttle member 42 reaches its fully advanced position, the movable cutter member 32 is midway in its motion towards the stationary cutting member 28. Vacuum is then supplied to the stationary vacuum chamber 40 holding the web 20 in position while the vacuum to the shuttle member 42 is released. The shuttle member then begins its retraction as the movable cutter member 32 engages the end of web 20 and cuts the strip 76 from it against cutting surface 30 of stationary cutting member 28. At this time, vacuum is applied to the end 38 of the movable cutter member 32 to secure the strip 76, which has been cut, to the end of the cutter member as it continues to advance until it engages the waiting anvil 74 on the stationary transfer member 12. The waiting anvil is supplied with vacuum and, as the strip 76 is gripped thereby, the vacuum to the end 38 of the movable cutting member 32 is turned off, releasing the strip to be held by the anvil 74 as the movable cutting member 32 reverses its direction of travel toward the fully retracted position and the shuttle member 42 again engages the web 20 to advance the next increment to the cutting station. As the movable cutting member 32 is retracted from the transfer drum, the drum drive indexes the drum 90° to the next stationary position. As this indexing occurs, the strip 76 which had been supplied to the drum after the previous cutting operation is advanced through the tacking station 14 at substantially the same velocity as that of the web 24 moving therethrough. As that anvil 74 and the strip 76 carried thereby move through the tacking station, substantially as illustrated in FIG. 3 (and in phantom in FIG. 2) the strip is brought into contact with and transversely of the lower, first surface of the second web 24. The location of the end of ultrasonic horn 26 with respect to the position of the anvil 74 in the tacking station, in cooperation with the thickness of both web 24 and strip 76, causes the strip and web 24 to be compressed between the anvil and the ultrasonic horn 26, thereby tacking the strip to the first surface of web 24 at the location of the ultrasonic horns, i.e. the lateral edges of web 24. At this point the vacuum to the anvil 74 in the tacking station is turned off, releasing the strip 76 to remain adhered to the first surface of web 24 as it continues its motion in the direction indicated by arrow 84.

It will be seen that the present invention provides a method and apparatus for attaching a strip of a first material to a second web of material while the second web is moved continuously through the attaching station thereby simplifying the apparatus and increasing the productivity thereof by eliminating the intermittent motion of that web. Moreover, the present invention permits the application of a strip of material to a web wherein the strip is provided on both surfaces with a hot melt adhesive. This is accomplished without requiring the activation of the adhesive and the attendant problems of the adhesive strip sticking to portions of the apparatus or causing dirt problems on the apparatus with the attendant maintenance requirements.

The invention has been described in detail with particular reference to preferred embodiments thereof, but it will be understood that variations and modifications can be effected within the spirit and scope of the invention.

What is claimed is:

1. The method of attaching a strip of a first material having a hot melt adhesive on both sides thereof to a second web of material comprising the steps of supplying a first web of said first material to a cutting station, cutting said strip from the end of said first web and transferring said strip to a sealing station on a transfer member, supplying said second web of material to said sealing station at a substantially constant velocity, moving said strip through said sealing station at a velocity substantially equal to the velocity of said second web and bringing said strip into contact with a first surface of said second web, said sealing station including ultrasonic transducer means arranged to contact the other surface of said second web, compressing said strip and said second web between said transfer member and said ultrasonic transducer means and ultrasonically sealing the strip to said first surface of said second web, releasing said strip from said transfer member, and stopping said transfer member.

2. The method of attaching a strip of a first material to a web of a second material comprising the steps of supplying a first web of said first material to a cutting station, cutting said strip from the end of said first web, and transferring said strip to a support surface on a stationary transfer member having a plurality of equispaced strip-receiving support surfaces thereon, rotating said transfer member with said strip on said support surface to a sealing station, supplying said web of said second material to said sealing station at a predetermined velocity, moving said strip on the support surface of the transfer member through said sealing station at a velocity substantially equal to the velocity of said second web and bringing said strip into contact with a first surface of said second web, said sealing station including sealing means arranged to contact the other surface of said second web, compressing said strip and said second web between said transfer member and said sealing means and sealing said strip to said first surface of said second web, releasing said strip from said support surface of said transfer member, and stopping said transfer member with another support surface at said strip cutting station.

3. The method of attaching a strip of a first material having an adhesive on both sides thereof to a second web of material comprising the steps of supplying a first web of said first material to a cutting station, advancing said first web through said cutting station a distance substantially equal to the width of said strip to be formed therefrom, cutting said strip from the end of said first web with a moving cutting member, holding said cut strip on said moving cutting member and transferring said strip to a transfer drum, rotating said transfer drum with said strip thereon to a tacking station, supplying said second web of material to said tacking station at a predetermined velocity, moving said strip on the transfer drum through said tacking station at a velocity substantially equal to the velocity of said second web and bringing said strip into contact with a first surface of said second web, said tacking station including ultrasonic transducer means arranged to contact the other surface of said second web, compressing said strip and said second web between said transfer drum and said ultrasonic transducer means and ultrasonically tacking said strip to said first surface of said second web, and releasing said strip from said transfer drum.

4. The method of attaching a strip of a first material having a hot melt adhesive on both sides thereof to a second web of material comprising the steps of supplying a first web of said first material intermittently to a cutting station, said first web having a width substantially equal to the length of said strip to be formed therefrom, advancing said first web toward said cutting station a distance substantially equal to the width of said strip to be formed therefrom, cutting said strip from the end of said first web between a stationary cutting member and a cooperating moving cutting member, holding said cut strip on said moving cutting member and transferring said strip to an anvil on a stationary rotary transfer drum, intermittently rotating said transfer drum with said strip on an anvil thereof to a tacking station, supplying said second web of material to said tacking station at a substantially constant velocity, moving said strip on the anvil of the rotary transfer drum through said tacking station at a velocity substantially equal to the velocity of said second web and bringing said strip into contact with and transversely of a first surface of said second web, said tacking station including a pair of ultrasonic transducers arranged to contact the edges of the other surface of said second web, compressing said strip and said second web between said anvil and said ultrasonic transducers and ultrasonically tacking the ends of said strip to said first surface of said second web, and releasing said strip from said anvil.

5. The method of attaching a first sheet-like material to a substantially non-tacky surface of a second material, said first material having a normally non-tacky heat activatable adhesive on both surfaces thereof, said method comprising the steps of bringing a surface of an unheated portion of said first material into contact with said surface of said second material, contacting the other surface of said second material with ultrasonic transducer means and compressing said first material and said second material between said ultrasonic transducer means and an anvil means, supplying energy to said ultrasonic transducer means whereby said first material is sealed to said second material without actuating said heat activatable adhesive on the surface of said first material in contact with said anvil means.

6. Apparatus for attaching a strip of a first material having an adhesive on both sides thereof to a second web of material, said apparatus comprising a cutting station, a transfer drum, and a tacking station including ultrasonic transducer means, means for supplying a first web of said first material to said cutting station, means for advancing said first web through said cutting station a distance substantially equal to the width of said strip to be formed therefrom, means for cutting said strip from the end of said first web with a moving cutting member, means for holding said cut strip on said moving cutting member and transferring said strip to said transfer drum, means for rotating said transfer drum with said strip thereon to said tacking station, means for supplying said second web of material to said tacking station at a predetermined velocity, said rotating means arranged to move said strip on the transfer drum through said tacking station at a velocity substantially equal to the velocity of said second web and bringing said strip into contact with a first surface of said second web, said ultrasonic transducer means arranged to contact the other surface of said second web thereby compressing said strip and said second web between said transfer drum and said ultrasonic transducer means to ultrasonically tack said strip to said first surface of said second web, said transfer drum arranged to thereafter release said strip.

7. Apparatus for attaching a strip of a first material having a hot melt adhesive on both sides thereof to a second web of material, said apparatus comprising a cutting station, a rotary transfer drum having at least a strip-receiving anvil thereon, and a tacking station including a pair of ultrasonic transducers, means for supplying a first web of said first material intermittently to said cutting station, said first web having a width substantially equal to the length of said strip to be formed therefrom, means for advancing said first web through said cutting station a distance substantially equal to the width of said strip to be formed therefrom, said cutting station including a stationary cutting member and a cooperating moving cutting member, means for holding said cut strip on said moving cutting member and transferring said strip to an anvil on said rotary transfer drum while said drum is stationary, means for intermittently rotating said transfer drum with said strip on an anvil thereof to said tacking station, means for supplying said second web of material to said tacking station at a substantially constant velocity, said rotary transfer drum rotating means arranged to move said strip on the anvil of the rotary transfer drum through said tacking station at a velocity substantially equal to the velocity of said second web whereby said strip is brought into contact with and transversely of a first surface of said second web, said ultrasonic transducers at said tacking station arranged to contact the edges of the second surface of said second web as the strip is brought into contact with the first surface thereof thereby compressing said strip and said second web between said anvil and said ultrasonic transducers and ultrasonically tacking the ends of said strip to said first surface of said second web, and means for releasing said strip from said anvil.

8. Apparatus for attaching a strip of a first material to a second web of material, said apparatus comprising means for forming said strip, a transfer drum arranged for intermittent rotation, and a sealing station including ultrasonic transducer means, means for placing a strip on said transfer drum while it is stationary, means for rotating said transfer drum with said strip thereon to said sealing station, means for supplying said second web of material to said sealing station at a predetermined velocity, said rotating means arranged to move said strip on the transfer drum through said sealing station at a velocity substantially equal to the velocity of said second web and bringing said strip into contact with a first surface of said second web, said ultrasonic transducer means arranged to contact the other surface of said second web thereby compressing said strip and said second web between said transfer drum and said ultrasonic transducer means to ultrasonically tack said strip to said first surface of said second web, means arranged to thereafter release said strip from said transfer drum, and means arranged to stop said transfer drum.

9. Apparatus for attaching a strip of a first material to a second web of material, said apparatus comprising means for forming said strip, a rotary transfer drum having a plurality of strip-receiving anvils equispaced about the periphery thereof, and a sealing station including ultrasonic transducer means, means for placing a strip on an anvil on said rotary transfer drum while said drum is stationary, means for intermittently rotating said transfer drum with said strip on an anvil thereof to said sealing station, means for supplying said second web of material to said sealing station at a predetermined velocity, rotary transfer drum rotating means arranged to move said strip on the anvil of the rotary transfer drum through said sealing station at a velocity substantially equal to the velocity of said second web whereby said strip is brought into contact with and transversely of a first surface of said second web, said ultrasonic transducer means at said sealing station arranged to contact the second surface of said second web as the strip is brought into contact with the first surface thereof thereby compressing said strip and said second web between said anvil and said ultrasonic transducer means and ultrasonically sealing the strip to said first surface of said second web, and means for releasing said strip from said anvil.

* * * * *